(12) United States Patent
Kishinevsky et al.

(10) Patent No.: US 9,614,666 B2
(45) Date of Patent: Apr. 4, 2017

(54) ENCRYPTION INTERFACE

(71) Applicant: INTEL CORPORATION, Santa Clara, CA (US)

(72) Inventors: Eugene M. Kishinevsky, Hillsboro, OR (US); Uday R. Savagaonkar, Portland, OR (US); Alpa T. Narendra Trivedi, Hillsboro, OR (US); Siddhartha Chhabra, Hillsboro, OR (US); Baiju V. Patel, Portland, OR (US); Men Long, Beaverton, OR (US); Kirk S. Yap, Westborough, MA (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/581,946

(22) Filed: Dec. 23, 2014

(65) Prior Publication Data

US 2016/0182223 A1 Jun. 23, 2016

(51) Int. Cl.
*G06F 21/78* (2013.01)
*H04L 9/06* (2006.01)
*G06F 12/14* (2006.01)
*G09C 1/00* (2006.01)
*G06F 21/85* (2013.01)

(52) U.S. Cl.
CPC ........ *H04L 9/0631* (2013.01); *G06F 12/1408* (2013.01); *G06F 12/1425* (2013.01); *G06F 21/85* (2013.01); *G09C 1/00* (2013.01); *G06F 2212/1052* (2013.01); *H04L 2209/125* (2013.01)

(58) Field of Classification Search
None
See application file for complete search history.

(56) References Cited

U.S. PATENT DOCUMENTS

| 8,468,365 | B2* | 6/2013 | Gueron | G06F 12/1408 713/189 |
| 8,555,088 | B2* | 10/2013 | Saarinen | G06F 15/167 380/37 |
| 2010/0191982 | A1* | 7/2010 | Goto | G06F 21/72 713/192 |
| 2011/0085657 | A1* | 4/2011 | Matthews, Jr. | G06F 12/1408 380/28 |
| 2011/0123020 | A1* | 5/2011 | Choi | H04L 9/0637 380/28 |
| 2011/0293097 | A1* | 12/2011 | Maino | G06F 12/0811 380/279 |
| 2012/0314857 | A1* | 12/2012 | Minematsu | H04L 9/0618 380/44 |

(Continued)

*Primary Examiner* — Venkat Perungavoor
(74) *Attorney, Agent, or Firm* — Lowenstein Sandler LLP

(57) ABSTRACT

Encryption interface technologies are described. A processor can include a system agent, an encryption interface, and a memory controller. The system agent can communicate data with a hardware functional block. The encryption interface can be coupled between the system agent and a memory controller. The encryption interface can receive a plaintext request from the system agent, encrypt the plaintext request to obtain an encrypted request, and communicate the encrypted request to the memory controller. The memory controller can communicate the encrypted request to a main memory of the computing device.

15 Claims, 14 Drawing Sheets

(56) References Cited

U.S. PATENT DOCUMENTS

| | | | |
|---|---|---|---|
| 2013/0091237 A1* | 4/2013 | Arulambalam | H04L 65/60 709/213 |
| 2013/0166920 A1* | 6/2013 | Cousins | G06F 12/1408 713/189 |
| 2014/0006805 A1* | 1/2014 | Colp | G06F 12/1425 713/193 |

* cited by examiner

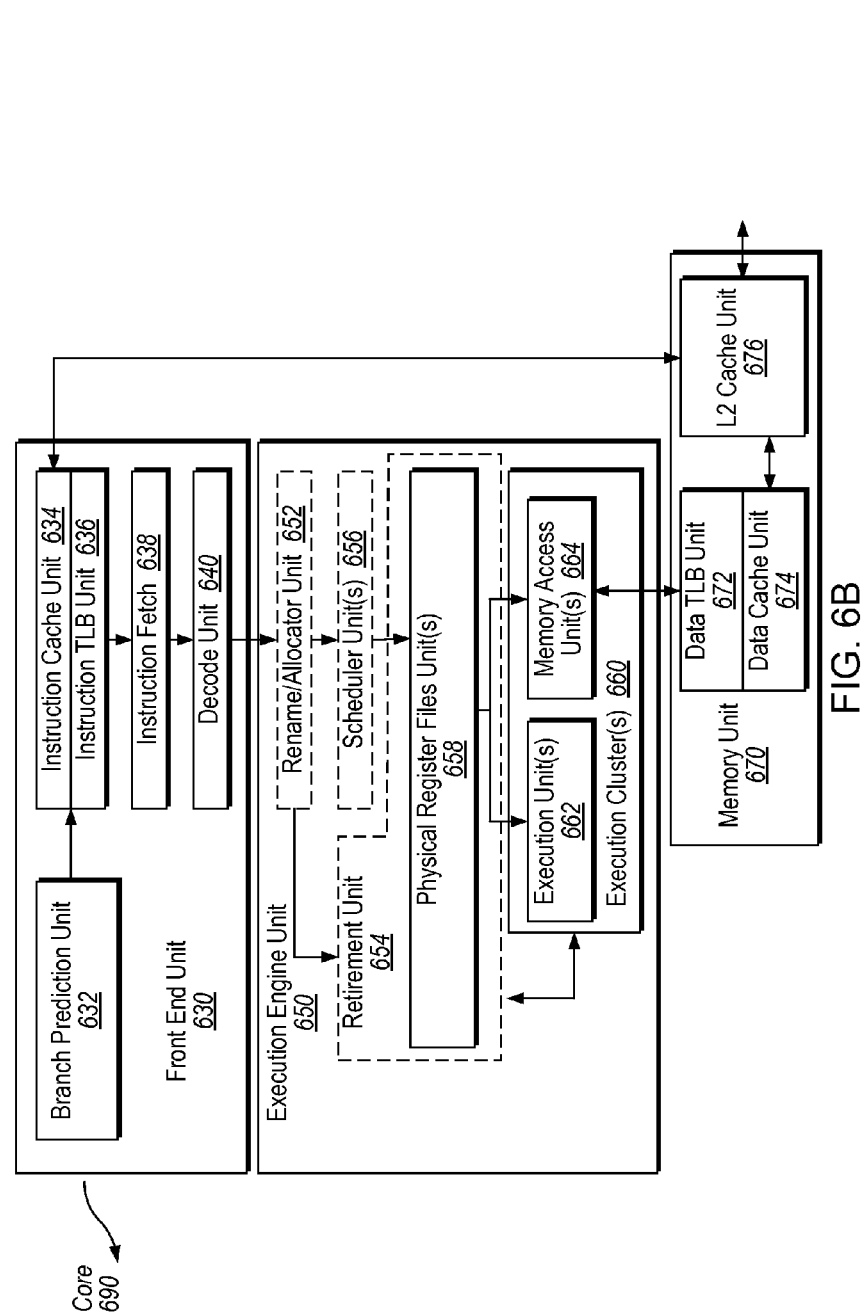
FIG. 6A
FIG. 6B

ENCRYPTION INTERFACE

The present disclosure pertains to computer systems; more specifically, to protection of data stored in the memory of a computer system.

BACKGROUND

Computer systems, such as hardware systems and software systems that run on computers, often have undetected flaws that can be exploited by hardware attacks or software attacks. For example, a side-channel attack can exploit a flaw in a computer hardware system to steal valuable data. An attacker implementing a side channel attack can gain information using physical access to a computing system. Side channel attacks can exploit timing information, power consumption, electromagnetic leaks, or sounds of a computing system exploit a computing system and gain access to information.

BRIEF DESCRIPTION OF THE DRAWINGS

FIG. 6A is a block diagram illustrating an in-order pipeline and a register renaming stage, out-of-order issue/execution pipeline according to one embodiment.

FIG. 6B is a block diagram illustrating a micro-architecture for a processor that implements secure memory repartitioning according to one embodiment.

DESCRIPTION OF EMBODIMENTS

Figure 1:
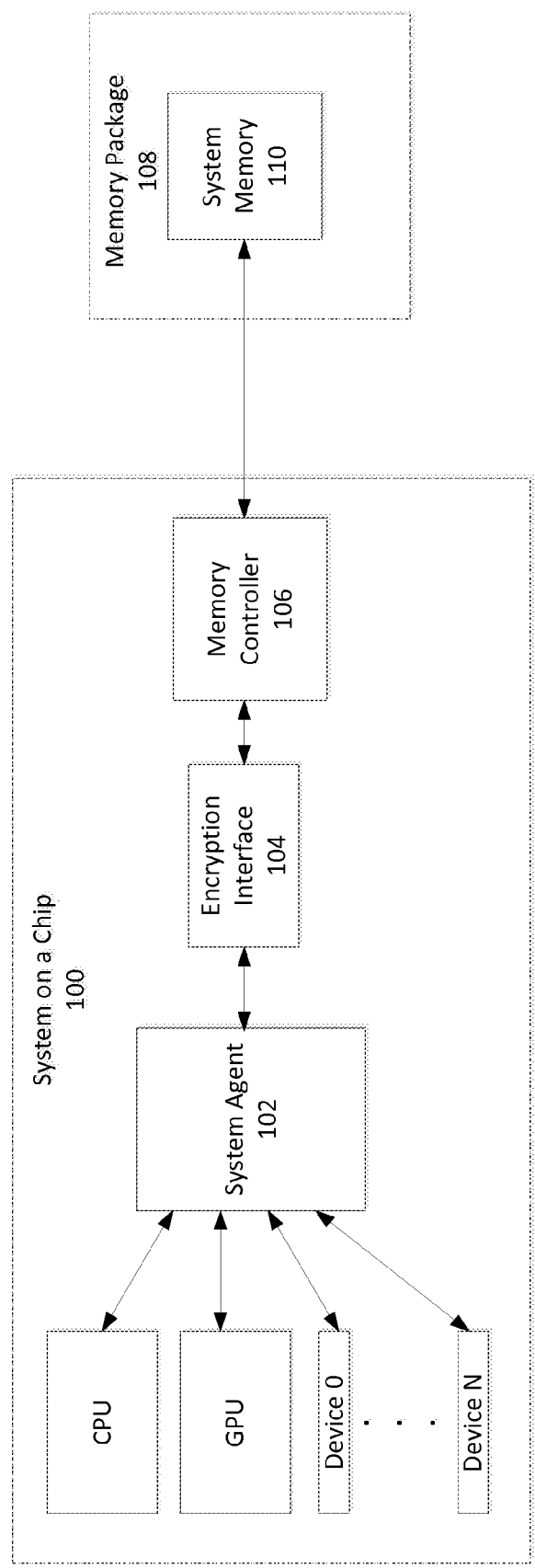
FIG. 1 illustrates a total memory encryption interface located that communicates information between a system agent and a memory controller according to one embodiment.

Total memory encryption protection technologies are described.

Data theft is becoming a growing concern for many companies and clients. Side-channel attacks have been used to steal valuable hard-drive encryption keys, personal data, and IP. A side-channel attack can be an attack to gain information using physical access to a computing system, rather than through software hacking. Side-channel attacks can exploit timing information, power consumption, electromagnetic leaks, or sounds of a computing system to gain access to exploit a computing system and gain access to information.

One example of a side-channel attack can be a cold boot attack or a platform reset attack. To employ a platform reset attack, an attacker can cycle a running computer off and on without letting the operating system shut down cleanly (e.g. a reset). The attacker can then use a disk or drive with a special boot sector to boot the system and dump the contents of pre-boot memory to a file. Alternatively, an attacker can remove memory modules from an original computing system and quickly place the memory modules into a compatible machine under the attacker's control (cold boot). The compatible machine is then booted to enable the attacker access to the data of the removed memory modules.

Other examples of side-channel attacks can include: timing attack, e.g. attacks measuring how much time various computations take to perform; power monitoring attacks, e.g. attacks that monitor varying power consumption by the hardware during computations; electromagnetic attacks, e.g. attacks using leaked electromagnetic radiation that can provide plaintext information or other information; differential fault analysis, e.g. attacks which introduce faults in a computation to discover sensitive data; and data remanence attacks, e.g. attacks where sensitive data is read after supposedly having been deleted.

Side-channel attacks, such as cold boot attacks, can rely on the data remanence of system memory, such as dynamic random-access memory (DRAM) or static random-access memory (SRAM), to retrieve secure data in the system memory. When the secure data is retrieved, the data can be analyzed to find sensitive data, such as the authentication keys in the data. The side-channel attacks can be used against systems with full disk encryption, such as systems using trusted platform module secure crypto-processing, because the attack is on a hardware level.

Traditional data encryption solutions used to protect against side-channel attacks can have performance overheads that are unacceptable for many applications. The performance overheads of traditional data encryption solutions may limit employing the traditional data encryption solutions to only hardened security applications.

One memory encryption solution provides some additional security via integrity checking, but may incur memory access latency and bandwidth overheads that may be unacceptable for some applications. Integrity checking uses message authentication codes (MACs) to be stored in a secure area on-die or a hash-tree to be implemented with the root of the tree being stored on-die and the rest being stored in off-die memory. These methods may incur performance, storage, bandwidth, and energy overheads. This memory encryption solution may decrease memory bandwidth. Because of the performance and storage overhead of the solution, the solution may be limited to a small subset of a memory range and may only be used by specific applications with strict security requirements.

Embodiments described herein may address the above noted deficiency in data protection by using an encryption interface, such as a total memory encryption (TME), interface to provide an encryption with increased performance, a reduced area footprint, and reduced power overheads. The encryption interface can enable encryption of an entire system memory range and can be used for a variety of applications. The encryption interface can encrypt data going to off-chip memory or system memory, such as DRAM and non-volatile RAM, using encryption standards with low overheads. In one example, an advanced encryption standard (AES) can be used by the encryption interface to encrypt data. In another example, Rivest Shamir Adleman (RSA) encryption can be used by the encryption interface to encrypt data. In another example, the encryption interface can use different encryption schemes to provide different levels of security for an application or computing system in view of a performance overhead threshold to encrypt a memory range.

FIG. 1 illustrates an encryption interface 104 located within a system on a chip (SoC) 100 that communicates information between a system agent 102 and a memory controller 106. In one example, the encryption interface 104 can receive a request message, such as a memory request, from a system agent 102. The request message may be an unsecured request message (such as a plaintext message) from the system agent 102 and the encryption interface 104 can encrypt the message before sending the message to the memory controller 106. The memory controller 106 can direct the encrypted message off of the SoC 100 to a memory package 108 of a computing system that can include a system memory 110. In another example, the system memory 110 of the memory package 108 can send a response message, such as a response to a memory request by a system agent 102, to the memory controller 106. The response message can include data requested by the system agent, such as for use by an application of the computing system. In one example, the response message can be unencrypted. In another example, the response message can be encrypted. The memory controller 106 can communicate the response message to the encryption interface 104. When the response message is encrypted, the encryption interface 104 can decrypt the response message to obtain a decrypted response, such as decrypting the response message to plaintext. The encryption interface 104 can then send the decrypted response message to the system agent 102.

The encryption interface 104 can be an interface between the system agent 102 and the memory controller 106 to communicate data between the system agent 102 and the memory controller 106. Additionally, the encryption interface 104 can encrypt and decrypt the data communicated between the system agent 102 and the memory controller 106. The encryption interface 104 can be transparent to modules or elements upstream and downstream of the encryption interface 104. For example, the encryption interface 104 can mimic or emulate a downstream module or element to an upstream module or element, or vice versa. The upstream or downstream modules or elements can be any combination of hardware (such as system agents, memory controllers, central processing units, and so forth), software (such as operating systems, applications, and so forth), and/or firmware (such as a combination of non-transitory computer readable memory and program code or data stored in the memory).

In one example, the encryption interface 104 can emulate the system agent 102 when sending a message to the memory controller 106. In this example, the presence of the encryption interface 104 can be transparent to the memory controller 106 by providing the message in the same format and structure as messages sent directly from the system agent 102 to the memory controller 106. In another example, the encryption interface 104 can emulate the memory controller 106 when sending a message to the system agent 102. In this example, the presence of the encryption interface 104 can be transparent to the system agent 102 by providing the message in the same format and structure as messages sent directly from the memory controller 106 to the system agent 102. In one example, the encryption interface 104 can be implemented as the hardware of the SoC 100 to provide secure data communication from memory of a computing system to an operating system (OS) or application while maintaining transparency to the system software. In another example, the encryption interface 104 can be implemented as software to provide secure data communication from memory of a computing system to an operating system (OS) or application.

One advantage of the encryption interface 104 being transparent to the modules or element downstream or upstream of the encryption interface 104 can be to enable the encryption interface to be integrated or ported between different SoC systems. Another advantage of the encryption interface 104 being transparent to the modules or elements downstream or upstream of the encryption interface 104 can be to enable the encryption interface 104 to support re-use and scalability within the SoC 100. For example, when the SoC 100 includes multiple system agents 102 and/or memory controllers 106, different encryption interfaces 104 can be used as interfaces between the multiple system agents 102 and/or the multiple memory controllers 106. In this example, as the SoC 100 is scaled up or down in size, a number of encryption interfaces 104 used can be adjusted.

In one example, when a first system agent 102 and/or memory controller 106 communicate secured data and a second system agent 102 and/or memory controller 106 communicate unsecured data, an encryption interface 102 can be used as an interface for the communication of the secured data and not for the communication of unsecured data. In this example, when the encryption interface 102 is used for secured data communication and not for unsecured data communication, the overhead and size of the SoC 100 can be optimized to provide encryption interfaces 102 for secured data communication while avoiding increased sized and overhead for the unsecured data communication. The encryption interface 102 can be located between system agents 102 and memory controllers 106 that are communicating secured data to reduce the performance overheads while maintaining data security. Another advantage of the encryption interface 104 being transparent to the downstream or upstream modules and elements can be to enable secured data communication that is transparent to system software, such as anti-virus scanners. Another advantage of the encryption interface 104 can be to encrypt a system memory range at a full memory bandwidth with a reduced performance overhead.

In one example, the encryption interface 104 can be configured to provide one or more optimizations, including: increased performance optimizations, reduced physical size or overhead of the SoC 100, reduced read latency, and/or a reduction of power consumption. In another example, the encryption interface 104 can be configured to provide the optimizations while supporting security for a memory range and bandwidth.

In one example, the encryption interface 104 can use an AES xor-encrypt-xor (XEX) encryption mode with tweak and ciphertext stealing (XTS) encryption to communicate data to the system memory 110 via the memory controller 106 to store protected data. One advantage of AES-XTS encryption can be to provide strong encryption protection. Another advantage of AES-XTS encryption can be to reduce memory or storage used by the encryption interface 104 and/or the memory controller 106 during the encryption/decryption and communication of the data to and from the system memory 110. The reduced memory or storage can enable the SoC 100 to have a reduced overall area fingerprint overhead and power consumption overhead while maintaining a low memory bandwidth usage. In one example, the encryption interface 104 can maintain low performance overheads by reducing delays at critical communication paths of the data.

Figure 2:
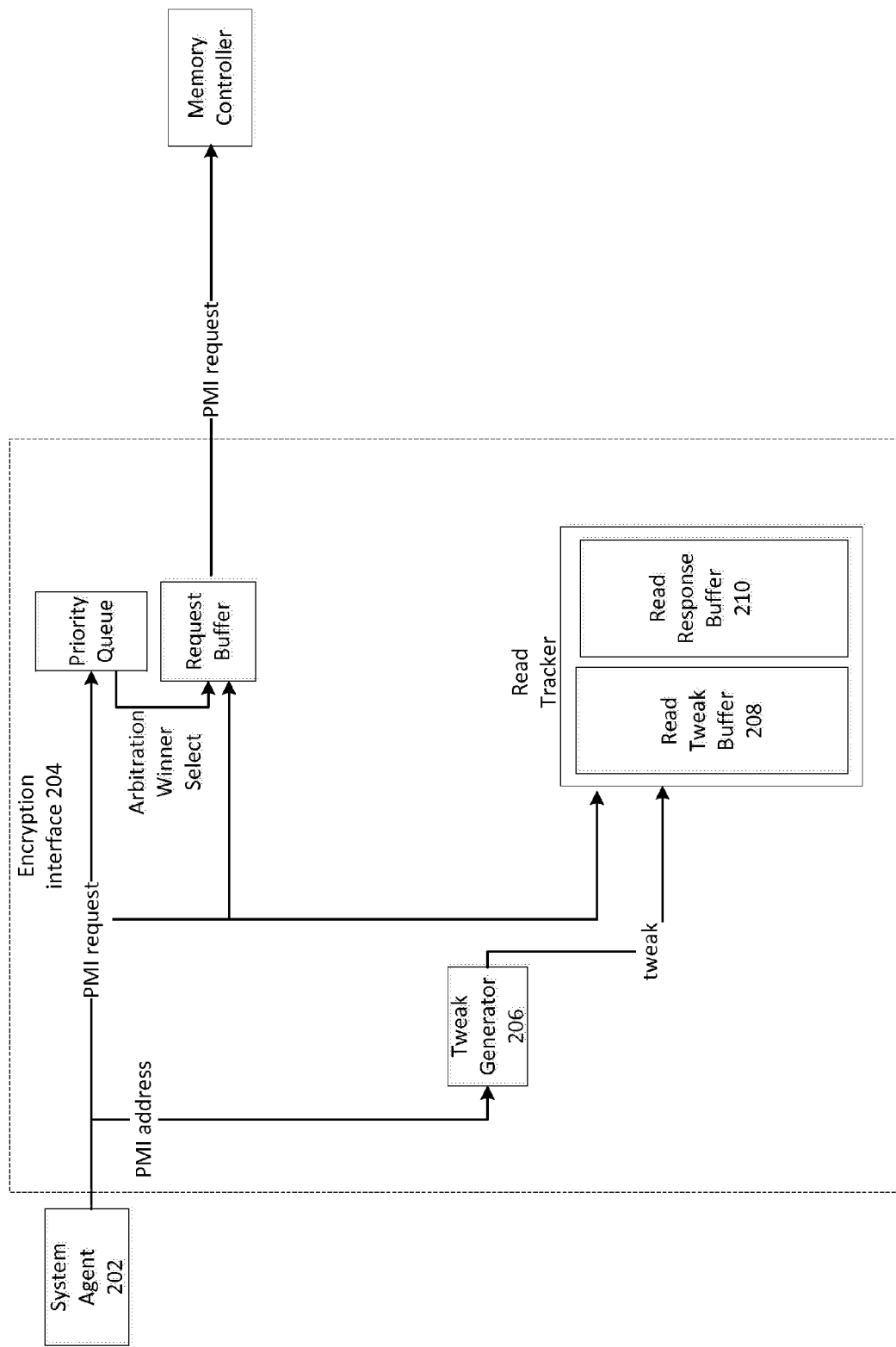
FIG. 2 illustrates a read request message path from a system agent to a memory controller via a memory encryption interface with reduced delays to critical communications path of the data according to one embodiment.

FIG. 2 illustrates a read request message path from a system agent 202 to a memory controller 212 via an encryption interface 204 with reduced delays to the critical communications path of the data. In one example, the encryption interface 204 can use AES-XTS encryption to compute a tweak that is derived from a memory address of system memory. The tweak can be a unique location in memory, e.g. two memory sectors containing the same information can each have a unique memory location. The tweak can be represented as a combination of a processor-memory interface (PMI) sector address and index of a block within the sector of memory.

When the encryption interface 204 receives an address and data, the encryption interface 204 can generate the tweak and encrypt/decrypt data. To mask a latency associated with a computation of a tweak, the computation of the tweak can be initiated for every incoming request at a tweak generator 206. The generated tweak can be stored in a tweak buffer 208 when the write or read data is being received at the encryption interface 204 to be encrypted or decrypted. By pre-computing the tweak (such as a read request tweak used for decryption), the encryption interface 204 can remove the tweak computation from the critical path of the read responses and reduce a roundtrip latency of reading data from the system memory. In another example, the read latency can be reduced by adding a fast bypass path for incoming read requests. When a buffer 210 storing incoming requests is empty then no arbitration between multiple read requests is required and the encryption interface 204 can direct the read request to bypass the read response buffer 210. The bypassing of the read response buffer 210 can decrease the read request latency.

Figure 3:
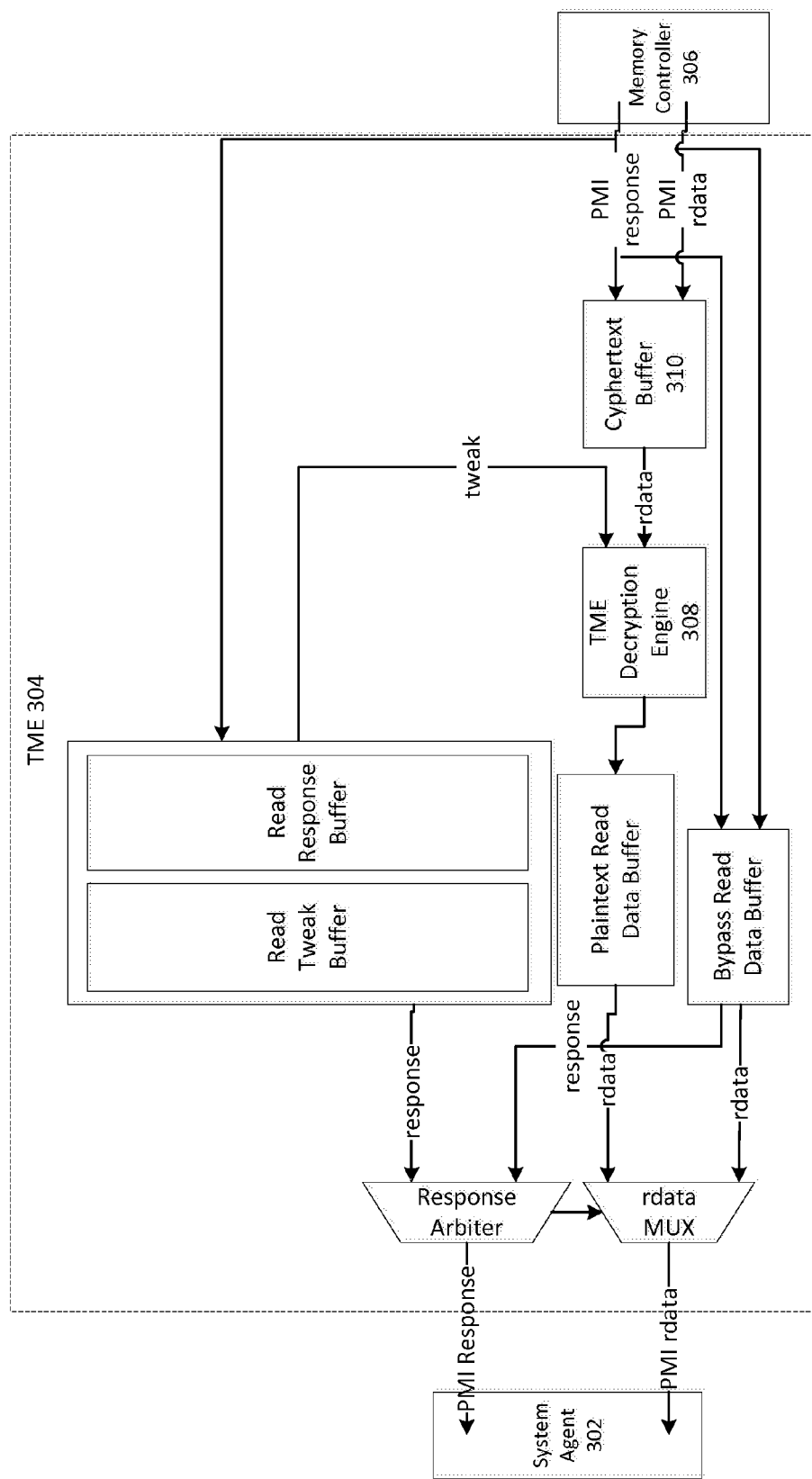
FIG. 3 illustrates a read response message path between a memory controller and a system agent via an encryption interface with reduced delays to a critical communications path of the data according to one embodiment.

FIG. 3 illustrates a read response message path between a memory controller 306 and a system agent 302 via an encryption interface 304 with reduced delays to the critical communications path of the data. The read response message path through the encryption interface 304 can include a path with reduced delays and latency to a critical communications path of the data. The delays and latency to the critical communications path can be reduced by initiating arbitration for a response link back to the system agent 302 while read data is being processed by the TME decryption engine 308. In one example, the decryption engine 308 can have a fixed latency for processing data to reduce the delays and latency to the critical communications path of the data.

FIG. 3 further illustrates that incoming read request responses can be stored in a ciphertext buffer 310, such as a ciphertext read data buffer. The ciphertext buffer 310 can store read data when a read tweak computation has not completed by the time the read data is returned by the memory controller. In one example, the read tweak computation may not be completed by the time the read data is returned by the memory controller 306 when a buffer bypass is used, allowing incoming read data to proceed directly to the decryption engine (as discussed in the preceding paragraphs). In this example, the total read response latency can be reduced by a number of clock cycles. For example, the decryption engine 308 can use 3 cycles, and a $4^{th}$ cycle can be used by output flip flops used to stage the data before sending the data out to the system agent 302. The data can be staged using flip flops to provide time for the data to propagate over a relatively long link.

Figure 4:
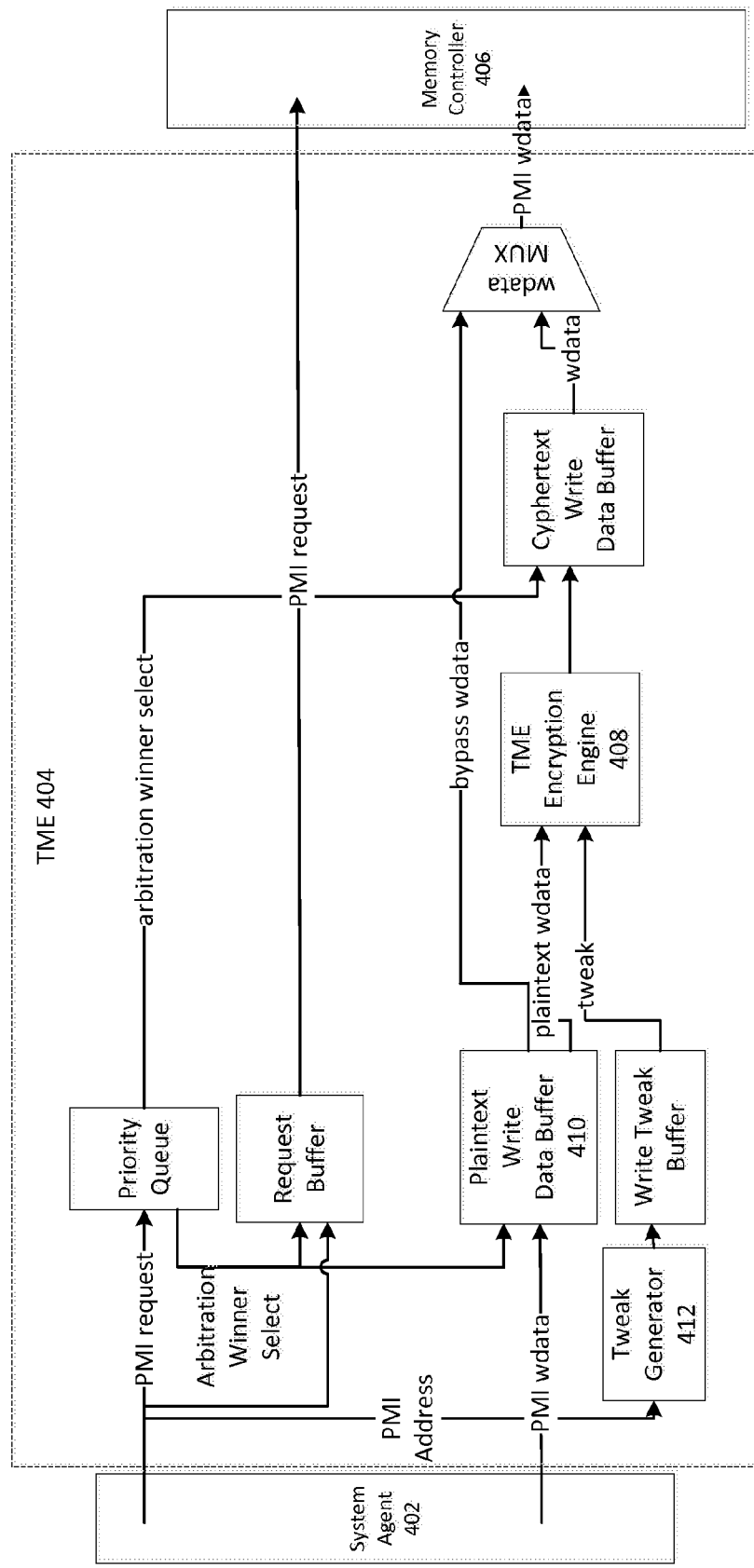
FIG. 4 illustrates a write request message path between a system agent and a memory controller via an encryption interface with reduced delays to a critical communications path of the data according to one embodiment.

FIG. 4 illustrates a write request message path between a system agent 402 and a memory controller 406 via an encryption interface 404 with reduced delays to the critical communications path of the data. FIG. 4 further illustrates an encryption interface 404 with cryptographic logic to communicate data between the system agent 402 and the memory controller 406. In one example, the encryption interface 404 can include a TME encryption engine 408. In one example, a width of a first datapath to the TME encryption engine 408 can be a same width as a second datapath to the encryption interface 404 (such as from the system agent 402 or the memory controller 406). In another example, a width of the first datapath to the TME encryption engine 408 can be half the width of the second datapath to the encryption interface 404. For example, the first datapath width to the encryption interface 404 can be 32 bytes (B) and the second datapath width to the TME encryption engine 408 can be 16 B. When the encryption engine 408 receives data on the first datapath that is half the width of the second datapath to the encryption interface 404, the TME encryption engine 408 can be clocked at a rate that is double a clock frequency of the encryption interface 404 to maintain a throughput of the TME encryption engine 408 that is equal to the overall throughput of the encryption interface 404. In this example, where a clock frequency of the encryption engine 408 is double the clock frequency of the encryption interface 404, a throughput of the encryption engine 408 can be maintained while a size of the TME encryption engine 408 can be reduced. A datapath and clock rate for the TME decryption engine discussed in the preceding paragraphs can similarly have a datapath that is half the width of the second datapath to the encryption interface and a clock rate that is twice the clock rate of the encryption interface. An advantage of the TME encryption engine 408 having half the datapath width of the encryption interface 404 can be to reduce a leakage power and area of the TME encryption engine 408, e.g. reduce the leakage power and area by half.

Additionally, FIG. 4 further illustrates that the encryption interface 404 can include a tweak engine or generator 412. In one example, the tweak generator 412 can have a pipeline depth that is the same as the TME encryption engine 408. In another example, a pipeline depth of the tweak generator 412 can be half the depth of the TME encryption engine 408. In this example, the tweak generator 412 can be clocked at a rate that is double a clock frequency of the encryption interface 404 to maintain a throughput of the tweak generator 412 that is equal to the overall throughput of the encryption interface 404. In one example, a tweak generator 412 that has a pipeline depth that is the same as the TME encryption engine 408 can have a 10 AES round tweak engine pipeline. In another example, a tweak generator 412, which has half the depth of the TME encryption engine 408, can have a 5 AES round tweak engine pipeline. When the AES round tweak engine pipeline is reduced by half, a feedback loop can cause tweaks to flow through the pipeline twice, resulting in 10 full AES rounds of encryption, such as required by a standard AES-XTS algorithm.

In one example, a first pass through the tweak generator 412 can be initiated on even clock cycles of the double clock frequency (e.g. 2× clock domain), and the second pass is initiated on odd cycles. In another example, a first pass through the tweak generator 412 can be initiated on the odd clock cycles in the 2× clock domain, and the second pass is initiated on the even cycles. An advantage of the TME encryption engine 408 with a first datapath width that is half the width of the second datapath to the TME encryption engine 408 and the tweak generator 412 with half the depth of the depth of the TME encryption engine 408 can be to reduce an overall size of the cryptographic logic of the encryption interface 404. Additionally, when the size of the cryptographic logic is reduced, a power consumption level of the encryption interface 404 can also be reduced.

In one example, the encryption interface can include key expansion logic with a key expansion engine. The key expansion engine can expand initial bulk and tweak encryption keys to generate additional rounds of keys. For example, the key expansion engine can expand initial bulk and tweak encryption keys to include 10 additional round keys. In this example, the encryption interface can initially receive 2 initial keys and the key expansion engine can generate 20 additional keys. In one example, the key expansion engine can expand a number of key when the encryption interface switches from a deep sleep state or after a boot cycle. In this example, a wake up time of the encryption interface can be relatively slow during a key expansion operation. To reduce a size of the key expansion logic of the encryption interface, the key expansion engine can contain logic to expand one key per cycle. For example, the key expansion engine can expand 10 keys from an initial key by feeding a newly generated key back into the key expansion engine to generate the next key. In one example, generated keys can be stored in a bank of flip flops to be used by a crypto engine of the encryption interface. One advantage of storing the generated keys in the bank of flip flops can be to reduce a size of the key expansion logic while adding clock cycles to a period to expand a key.

In one example, the encryption interface can include re-keying logic to provide rollback attack protection. The re-keying logic can prevent deterministic rollback of system memory from occurring. For example, rollback attacks can attempt to revert the system memory to a previous known state, such as the initial state at boot time. The rollback attacks can force critical parts of the system memory, such as disk encryption keys, into a known state and enable an attacker to decrypt data on a disk of the system. The re-keying logic can periodically re-key the encrypted data values, such as MACs. An advantage of re-keying the MACs can be to strengthen security properties of a cipher being used for encryption by decreasing or shortening an attack window. For example, without a shortened attack window (e.g., no re-keying) the attacker can conduct an attack for as long as the system is powered on. A shortened attack window decreases an amount of time an attacker has to break a cipher before the ciphertext is re-keyed.

The re-keying logic can demand that a ciphertext be read by the encryption interface, decrypted with an old key, re-encrypted with a new key, and written back to the system memory. In one example, to reduce system and operational overhead, the encryption keys used to generate the ciphertext may slowly and/or continuously change throughout a region of memory. In another example, a moving pointer can be kept that moves through a memory range of the system. In this example, encrypted data above the pointer can be in a new key or MAC range while the encrypted data below the pointer can still in an old key range. In another example, two keys can be live at the same time (e.g., the old key and the new key) to provide data security and reduce operational complexity. While a period between key updates for encrypted data can be a rollback window during which a rollback attack may be possible, as the window size can be non-deterministic and relatively short, replay attacks can be prevented using the re-keying logic.

In one example, when the encryption interface is idle, the encryption interface can begin traversing through the range of ciphertext in system memory with the new key, regenerating encrypted data words in the process. When idle time is below a threshold value to update the ciphertext on-the-fly, the encryption interface can use an urgency-based mechanism for the ciphertext update. In this example, sets of encrypted data words scheduled for an update with the new key can have an increased urgency value. The urgency value can be calculated similarly to memory accesses with varying urgency values. The re-keying accesses can compare re-keying urgency values against other memory traffic and when the re-keying urgency exceeds a threshold value, the ciphertext may be updated with a new key (e.g., even when lower priority memory traffic has to be stalled). The encryption interface using the urgency values can be a non-deterministic rollback prevention mechanism with an upper bound for how long a key window may be live before an update occurs.

An advantage of using the urgency values for the rollback prevention can be that latency critical high-priority bursts of memory traffic may not be affected by replay protection overheads. For example, the re-keying logic using urgency values can move at least a portion of rollback protection overheads into idle periods of memory traffic. Another advantage of the re-keying logic using urgency values can be to delay low-priority memory accesses while not delaying high-priority traffic. In one example, the rollback time window can be configured differently for different applications, e.g., trading off performance overheads for a shorter rollback window.

In one example, a memory interface of the SoC can support partial writes. For example, the memory interface can supports byte enabled writes, where a byte enable bit for each byte of write data defines whether that byte may be updated in memory during a write, and a cryptographic engine of the cryptographic logic can operate on segments of data (such as 16 B segments of data). In this example, a TME encryption or decryption engine may not encrypt or decrypt individual bytes of data. A partial write can be performed by using read-modify-write operations. In another example, head-of-line blocking by the partial write requests can be avoided by allowing other requests to bypass the partial write request in a priority queue and a write data buffer of the encryption interface when no address conflicts exist.

A plaintext write data buffer of the encryption interface can store incoming write data and merge data during a read-modify-write operation. In one example, the plaintext write data buffer can be constructed using a dual-ported register file. In another example, the plaintext write data buffer can store bypass data, TME data, and partial write data. An advantage of the plaintext write data buffer storing bypass data, TME data, and partial write data can be to reduce a number of buffers of the encryption interface thereby reducing an area of the memory interface and a power consumption level of the memory interface.

The encryption interface can include a dynamic bypass path to enable traffic to bypass the cryptographic logic of the encryption interface. In one example, a first type of memory traffic may not require encryption or may have stringent latency requirements, such as modem traffic. In this example, where the memory traffic that does not require encryption or has stringent latency requirements, the memory traffic can follow the dynamic bypass path in the encryption interface to bypass the cryptographic logic. This bypass path can enable requests and responses to pass through encryption interface with a reduced latency, such as a 0-cycle or 1-cycle latency. In another example, a second type of memory traffic may not use memory encryption. In this example, the encryption interface can be statically bypassed at boot time and incur no additional latency to the memory traffic (e.g. a 0-cycle bypass). The 0-cycle bypass can multiplex (MUX) incoming links to the outgoing links. At boot time, the encryption interface can set the MUX select signal to enable or disable the 0-cycle bypass.

An advantage of the encryption interface can be to provide compact encryption hardware with a low performance overhead. The compact and low performance overhead of the encryption interface can enable the encryption interface to be used with multiple memory controllers and system agents in a SoC to support a full memory bandwidth and range across a wide range of systems. In one example, the encryption interface can include a protocol translation interface to enable the integration of the encryption interface into processor cores and/or servers.

Figure 5A:
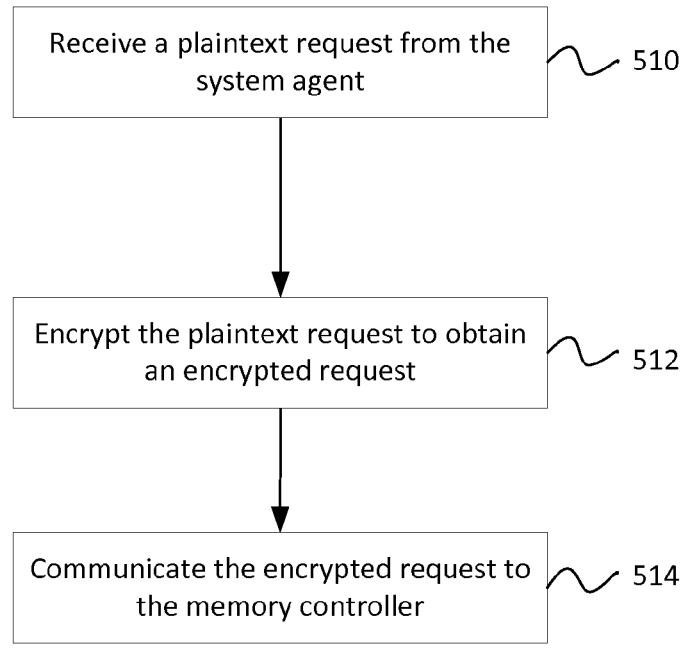
FIG. 5A is a flow diagram illustrating a functionality of an encryption interface in a SoC or a processor communicating a request between a system agent and a memory controller according to one embodiment.

FIG. 5A is a flow diagram illustrating a functionality 500 of an encryption interface in a system on a chip (SoC) or a processor communicating requests or responses between a system agent and a memory controller. Functionality 500 may be performed by processing logic that may comprise hardware (e.g., circuitry, dedicated logic, programmable logic, microcode, etc.), software (such as instructions running on the processor), firmware or a combination thereof. In one embodiment, the SoC 100 of FIG. 1 performs the functionality 500. Alternatively, other components of the SoC 100 of FIG. 1 may perform some or all of the functionality 500. In another embodiment, the processor 600 of FIG. 6A or 6B performs the functionality 500. In another embodiment, the processor 700 of FIG. 7 performs the functionality 500. In another embodiment, the processors 870 and/or 880 of FIG. 8 perform the functionality 500. In another embodiment, the processors 970 and/or 980 of FIG. 9 perform the functionality 500. In another embodiment, the one or more of the cores 1002 of FIG. 10 performs the functionality 500. In another embodiment, the cores 1106 and/or 1107 of FIG. 11 performs the functionality 500. In another embodiment, the processing device 1202 of FIG. 12 performs the functionality 500. Alternatively, other components of the computing systems of FIG. 1 and/or FIGS. 6-12 may perform some or all of the operations of the functionality 500.

Referring to FIG. 5A, the SoC or the processor can include: a system agent to communicate a plaintext request with a hardware functional block; an encryption interface coupled between the system agent and a memory controller; and the memory controller to communicate the encrypted request to a main memory of a computing device. The functionality 500 of the encryption interface begins by receiving the plaintext request from the system agent (block 510). The encryption interface can encrypt the plaintext request to obtain an encrypted request (block 512). The encryption interface can emulate the system agent interfacing with a memory controller. The arbiter can communicate the encrypted request to the memory controller (block 514).

Figure 5B:
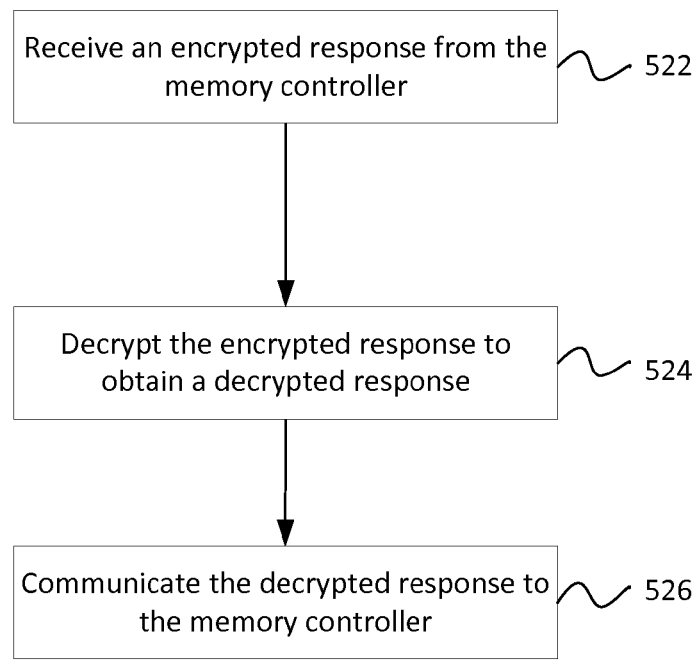
FIG. 5B is a flow diagram illustrating a functionality of an encryption interface in a SoC or a processor communicating a response between a system agent and a memory controller according to one embodiment.

FIG. 5B is a flow diagram illustrating a functionality 520 of an encryption interface in a SoC or a processor of an encrypted response between a system agent and a memory controller. Functionality 520 may be performed by processing logic that may comprise hardware (e.g., circuitry, dedicated logic, programmable logic, microcode, etc.), software (such as instructions running on the processor), firmware or a combination thereof. In one embodiment, the SoC 100 of FIG. 1 performs the functionality 520. Alternatively, other components of the SoC 100 of FIG. 1 may perform some or all of the functionality 520. In another embodiment, the processor 600 of FIG. 6A or 6B performs the functionality 520. In another embodiment, the processor 700 of FIG. 7 performs the functionality 520. In another embodiment, the processors 870 and/or 880 of FIG. 8 perform the functionality 520. In another embodiment, the processors 970 and/or 980 of FIG. 9 perform the functionality 520. In another embodiment, the one or more of the cores 1002 of FIG. 10 performs the functionality 520. In another embodiment, the cores 1106 and/or 1107 of FIG. 11 performs the functionality 520. In another embodiment, the processing device 1202 of FIG. 12 performs the functionality 520. Alternatively, other components of the computing systems of FIG. 1 and/or FIGS. 6-12 may perform some or all of the operations of the functionality 520.

Referring to FIG. 5B, the SoC or the processor can include: a system agent to communicate with an encryption interface; the encryption interface can be coupled between the system agent and a memory controller; and the memory controller can communicate responses from a main memory of a computing device to the encryption interface. The functionality 500 of the encryption interface begins by receiving an encrypted response from the memory controller (block 522). The encryption interface can decrypt the encrypted response to obtain a decrypted response (block 524). The encryption interface can communicate the decrypted response to the memory controller (block 526).

Figure 5C:
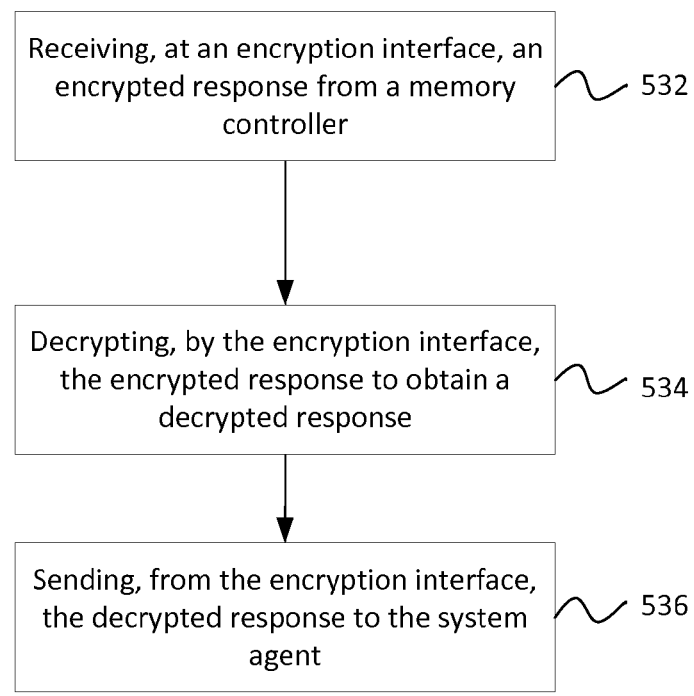
FIG. 5C is a flow diagram illustrating a method of communicating a decrypted response to a system agent according to one embodiment.

FIG. 5C is a flow diagram illustrating a method 530 of communicating a decrypted response to a system agent according to one embodiment. Method 530 may be performed by processing logic that may comprise hardware (e.g., circuitry, dedicated logic, programmable logic, microcode, etc.), software (such as instructions running on the processor), firmware or a combination thereof. In one embodiment, the SoC 100 of FIG. 1 performs the method 530. Alternatively, other components of the SoC 100 of FIG. 1 may perform some or all of the operations of the method 530. In another embodiment, the processor 600 of FIG. 6A or 6B performs the method 530. In another embodiment, the processor 700 of FIG. 7 performs the method 530. In another embodiment, the processors 870 and/or 880 of FIG. 8 perform the method 530. In another embodiment, the processors 970 and/or 980 of FIG. 9 perform the method 530. In another embodiment, the one or more of the cores 1002 of FIG. 10 performs the method 530. In another embodiment, the cores 1106 and/or 1107 of FIG. 11 performs the method 530. In another embodiment, the processing device 1202 of FIG. 12 performs the method 530. Alternatively, other components of the computing systems of FIG. 1 and/or FIGS. 6-12 may perform some or all of the operations of the method 530.

Referring to FIG. 5C, the method 530 begins by receiving, at an encryption interface, an encrypted response from a memory controller (block 532). The encryption interface can decrypt the encrypted response to obtain a decrypted response, where the encryption interface emulates the memory controller interfacing with a system agent (block 534). The encryption interface can send the decrypted response to the system agent, wherein the system agent communicates the decrypted response to an application (block 536).

FIG. 6A is a block diagram illustrating a micro-architecture for a processor 600 that implements secure memory repartitioning according to one embodiment. Specifically, processor 600 depicts an in-order architecture core and a register renaming logic, out-of-order issue/execution logic to be included in a processor according to at least one embodiment of the disclosure. The embodiments of the page additions and content copying can be implemented in processor 600.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 660. The decode unit 660 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 660 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 660 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
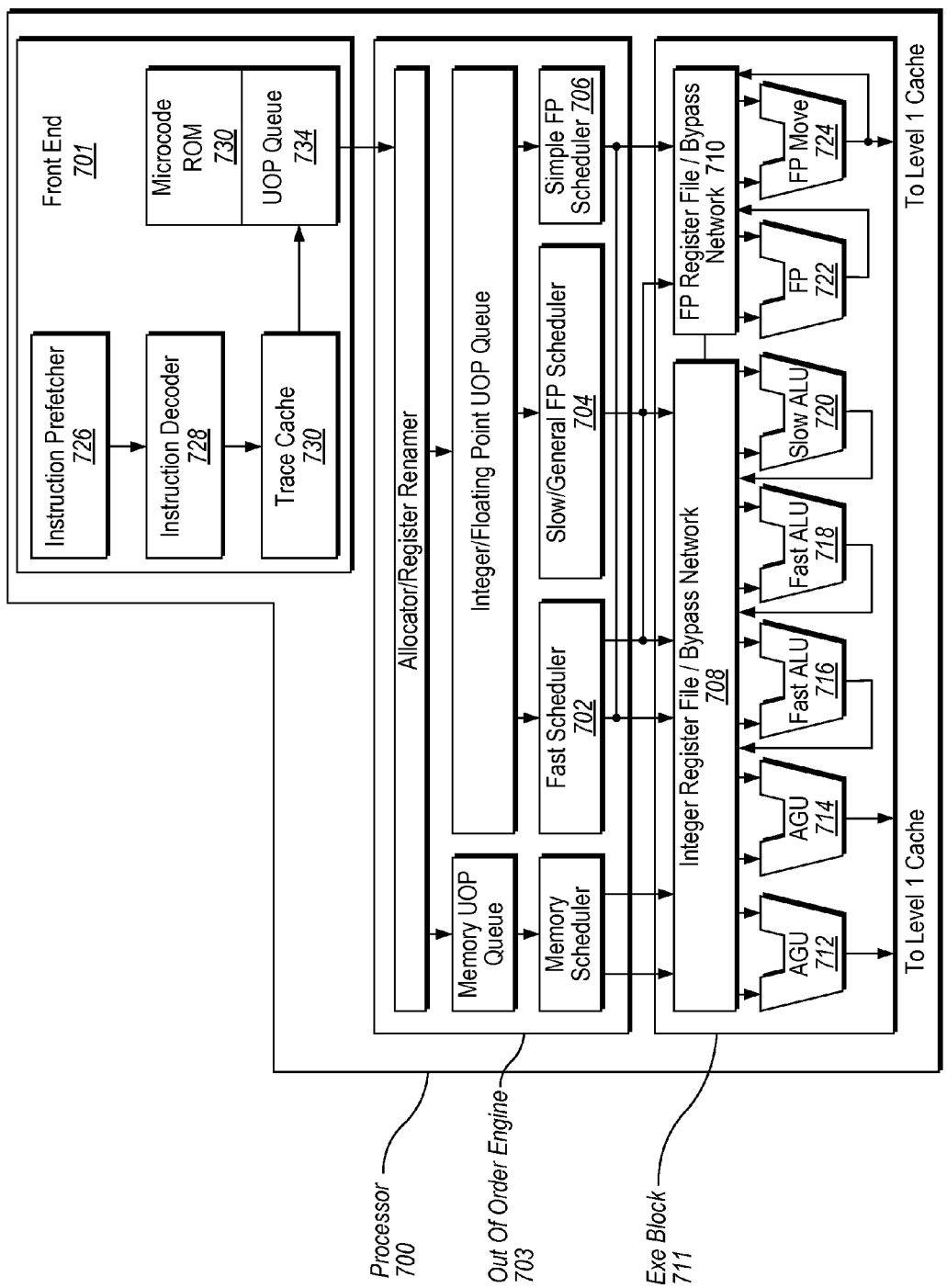
FIG. 7 illustrates a block diagram of the micro-architecture for a processor that includes logic circuits to perform secure memory repartitioning according to one embodiment.

FIG. 7 illustrates a block diagram of the micro-architecture for a processor 700 that includes logic circuits to perform secure memory repartitioning according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The embodiments of the page additions and content copying can be implemented in processor 700.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 710, 712, 714 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 710, 712, 714, where the instructions are actually executed. This section includes the register files 708, 710, that store the integer and floating point data operand values that the micro-instructions need to execute. The processor 700 of one embodiment is comprised of a number of execution units: address generation unit (AGU)

712, AGU 714, fast ALU 716, fast ALU 718, slow ALU 710, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 710 as the slow ALU 710 includes integer execution hardware for long latency type of operations, such as a multiplier, shifts, flag logic, and branch processing. Memory load/store operations are executed by the AGUs 712, 714. For one embodiment, the integer ALUs 716, 718, 710, are described in the context of performing integer operations on 64 bit data operands. In alternative embodiments, the ALUs 716, 718, 710, can be implemented to support a variety of data bits including 16, 32, 128, 256, etc. Similarly, the floating point units 712, 714, can be implemented to support a range of operands having bits of various widths. For one embodiment, the floating point units 712, 714, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement secure memory repartitioning according to one embodiment. In one embodiment, the execution block 711 of processor 700 may include MCU 115, to perform secure memory repartitioning according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
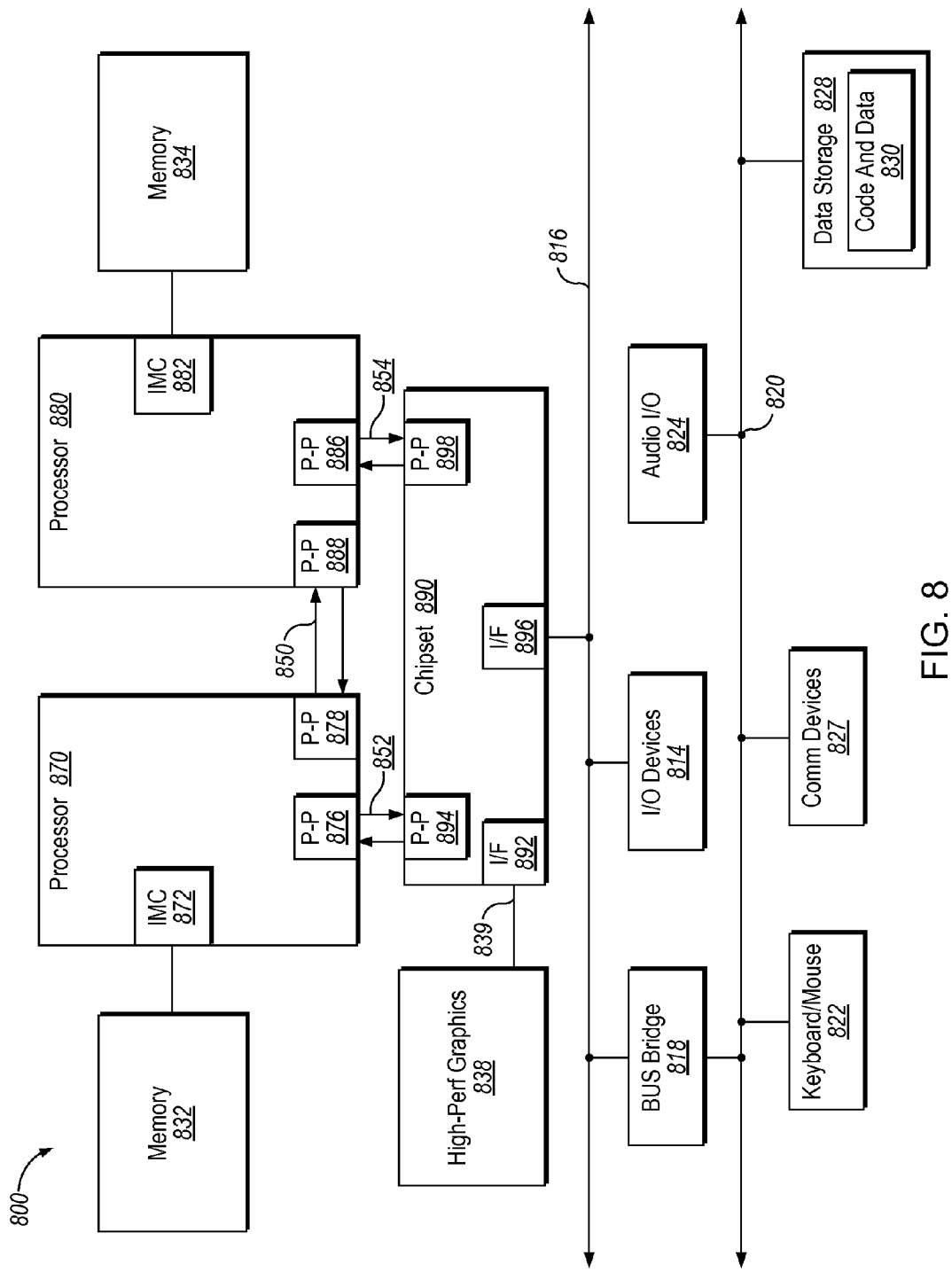
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include hybrid write mode logics in accordance with an embodiment of the present. The embodiments of the page additions and content copying can be implemented in the processor 870, processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus.

Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
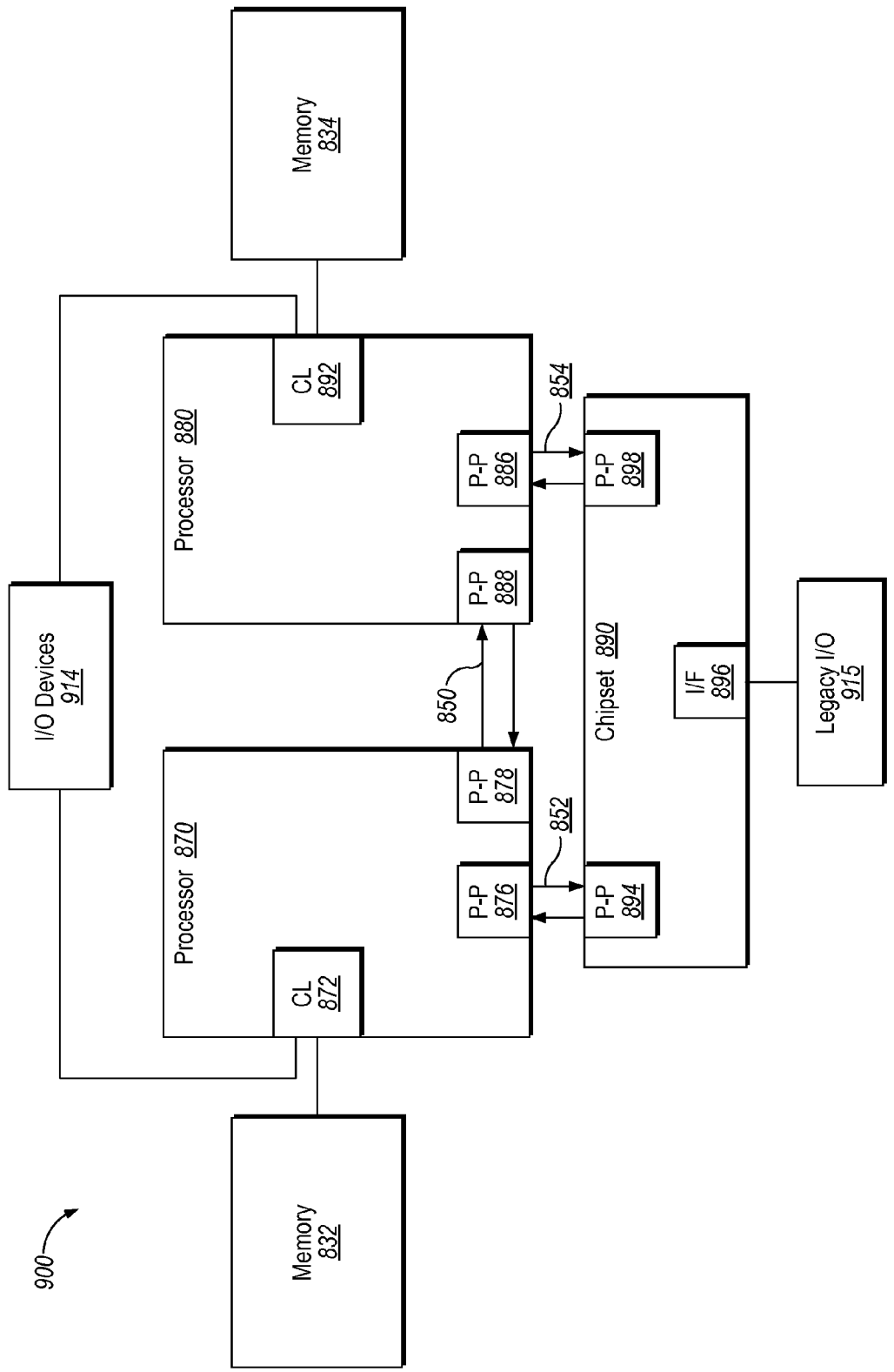
FIG. 9 is a block diagram of a computer system according to another implementation.

Referring now to FIG. 9, shown is a block diagram of a third system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 914 are also coupled to the control logic 972, 982. Legacy I/O devices 915 are coupled to the chipset 990. The embodiments of the page additions and content copying can be implemented in processor 970, processor 980, or both.

Figure 10:
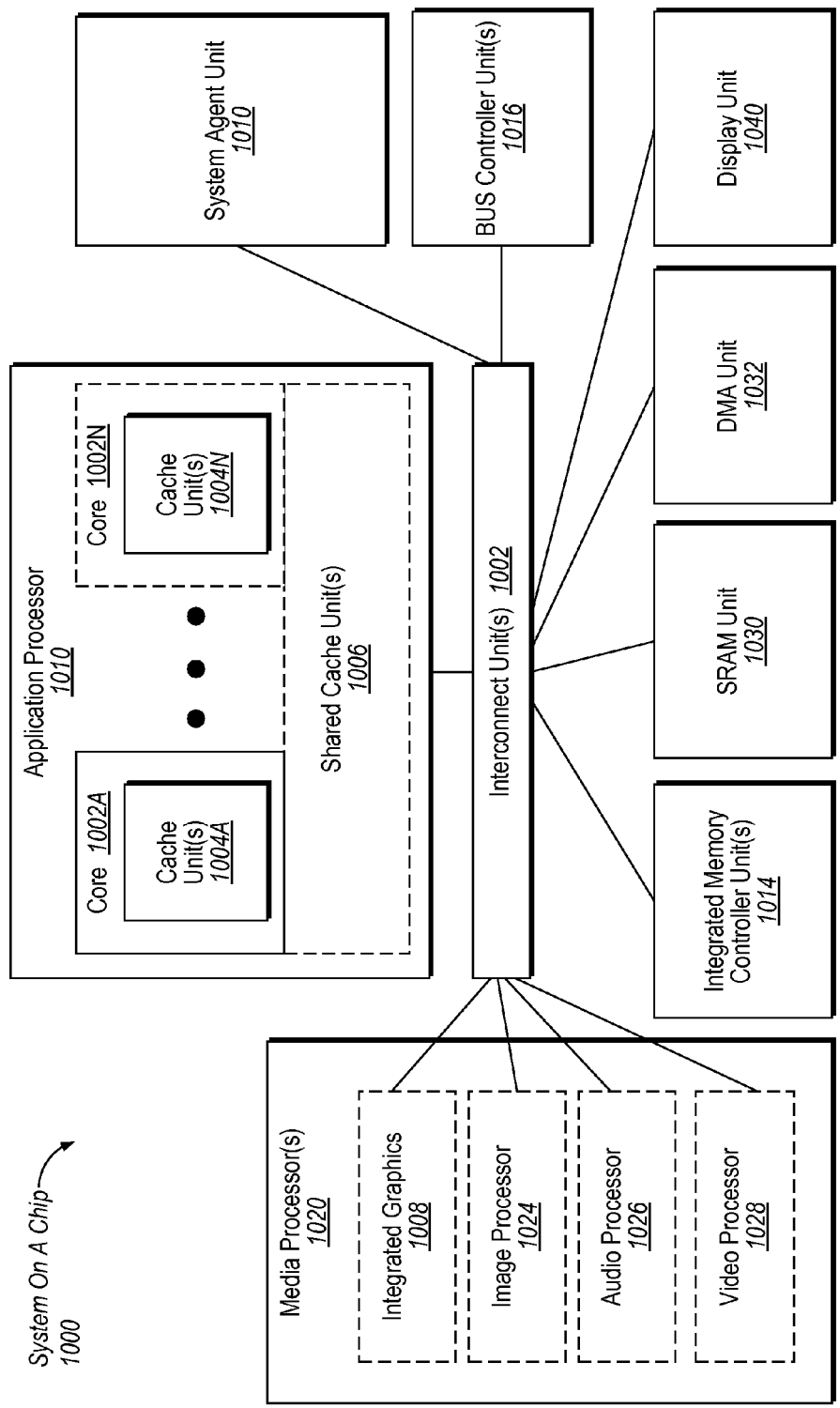
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. The embodiments of the pages additions and content copying can be implemented in SoC 1000.

Figure 11:
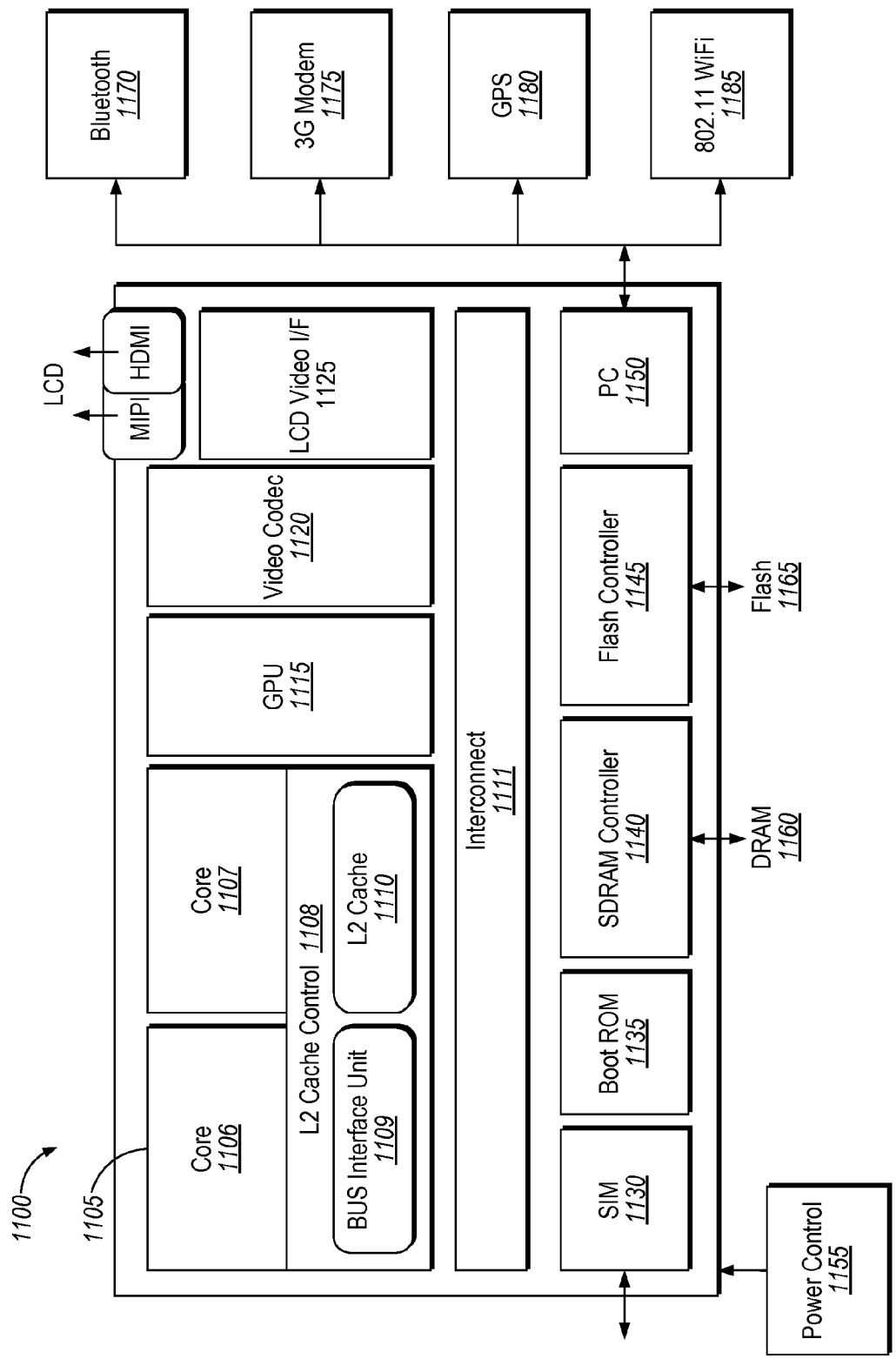
FIG. 11 illustrates another implementation of a block diagram for a computing system.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
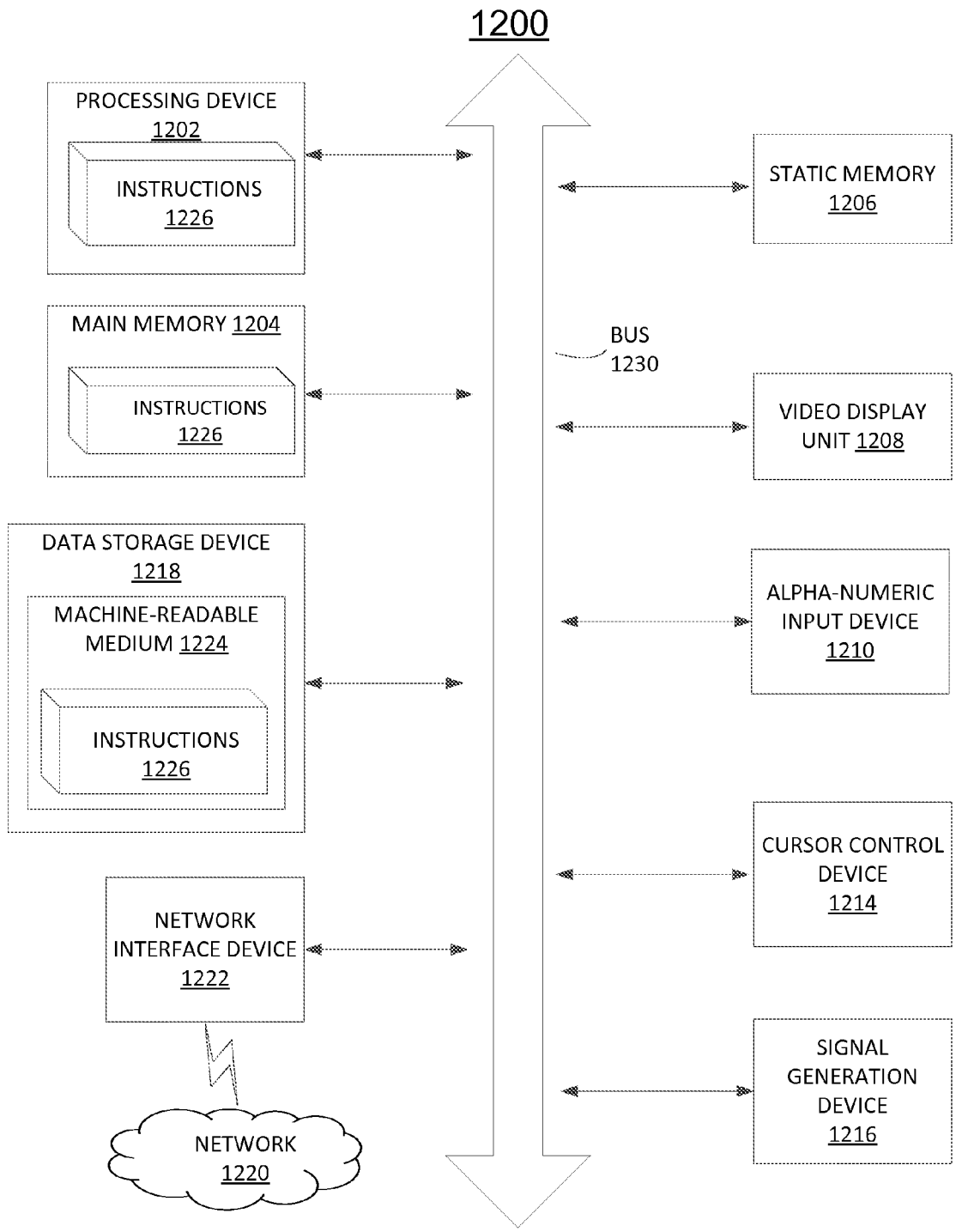
FIG. 12 illustrates another implementation of a block diagram for a computing system.

FIG. 12 illustrates a diagrammatic representation of a machine in the exemplary form of a computer system 1200 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device (processor) 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1202 may also be one or more special-purpose processing devices such as an application specific integrated circuit (ASIC), a field programmable gate array (FPGA), a digital signal processor (DSP), network processor, or the like. The processor 1202 is configured to execute instructions 1226 for performing the operations and steps discussed herein.

The computer system 1200 may further include a network interface device 1222. The computer system 1200 also may include a video display unit 1208 (e.g., a liquid crystal display (LCD), a cathode ray tube (CRT), or a touch screen), an alphanumeric input device 1210 (e.g., a keyboard), a cursor control device 1214 (e.g., a mouse), and a signal generation device 1216 (e.g., a speaker).

The data storage device 1218 may include a computer-readable storage medium 1224 on which is stored one or more sets of instructions 1226 (e.g., software) embodying any one or more of the methodologies or functions described herein. The instructions 1226 may also reside, completely or at least partially, within the main memory 1204 and/or within the processor 1202 during execution thereof by the computer system 1200, the main memory 1204 and the processor 1202 also constituting computer-readable storage media. The instructions 1226 may further be transmitted or received over a network 1220 via the network interface device 1234.

While the computer-readable storage medium 1224 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. The following examples pertain to further embodiments.

In Example 1, a processor including: 1) a system agent to communicate a plaintext request with a hardware functional block; 2) an encryption interface coupled between the system agent and a memory controller, the encryption interface to: a) receive the plaintext request from the system agent; b) encrypt the plaintext request to obtain an encrypted request, where the encryption interface emulates the system agent interfacing with a memory controller; and c) communicate the encrypted request to the memory controller; and 3) the memory controller to communicate the encrypted request to a main memory of a computing device.

In Example 2, the encryption interface of Example 1 can further emulate the system agent to the memory controller by structuring the encrypted request to be a same structure as messages sent directly from the system agent to the memory controller.

In Example 3, the processor of Examples 1-2 where the encryption interface and the system agent are integrated into a system on a chip (SoC).

In Example 4, the processor of Examples 1-3 where the encryption interface encrypts the plaintext request using an advanced encryption standard (AES) xor-encrypt-xor (XEX) encryption mode with tweak and ciphertext stealing (XTS) encryption.

In Example 5, the processor of Examples 1-4 where the encryption interface uses the AES XTS encryption to generate a tweak, wherein the tweak is a unique address indicating a location of data for the plaintext request in the main memory.

In Example 6, the processor of Examples 1-5 further including a tweak buffer to store the tweak until a request message is received at the encryption interface.

In Example 7, the processor of Examples 1-6 where the encryption interface can further: a) receive a plurality of request messages at the encryption interface; b) buffer the plurality of request messages at a request buffer of the encryption interface; and c) select the request message from the plurality of request messages at the request buffer to communicate to the memory controller.

In Example 8, the processor of Examples 1-7 the encryption interface can further bypass the request buffer to send the request message directly to the memory controller when the request buffer is empty.

In Example 9, the processor of Examples 1-8 where the plaintext request can be a first request to read data from the main memory or a second request to write data to the main memory.

In Example 10, the processor of Examples 1-9 further where the hardware functional block can be at least one of processor core, a graphics core, a cache agent, a system agent, or a memory agent.

Various embodiments may have different combinations of the structural features described above. For instance, all optional features of the processors and methods described above may also be implemented with respect to a system described herein and specifics in the examples may be used anywhere in one or more embodiments.

In Example 11, a system on a chip (SoC) including: 1) a system agent to communicate a plaintext request with a hardware functional block; 2) an encryption interface coupled between the system agent and a memory controller, the encryption interface to: a) receive the plaintext request from the system agent; b) encrypt the plaintext request to obtain an encrypted request, where the encryption interface emulates the system agent interfacing with a memory controller; and c) communicate the encrypted request to the memory controller; and 3) the memory controller to communicate the encrypted request to a main memory of a computing device.

In Example 12, the encryption interface of Example 11 can further include: a) an encryption engine to encrypt the plaintext request; and b) a decryption engine to decrypt the encrypted response to obtain the decrypted response.

In Example 13, the processor of Examples 11-12 where: a) a width of a first datapath to the encryption engine or the decryption engine is half a width of a second datapath between the encryption interface and the system agent or the memory controller; and b) a clock rate of the encryption engine or the decryption engine is twice a clock rate of the encryption interface.

In Example 14, the processor of Examples 11-13 where: a) the width of the first datapath to the encryption engine or the decryption engine is 16 bytes (B); and b) the width of the second datapath between the encryption interface and the system agent or the memory controller is 32 B.

In Example 15, the processor of Examples 11-14 where the encryption interface the can further include a tweak engine to generate a tweak, where: a) the tweak is a unique address indicating a location of data in a system memory, and b) a clock rate of the tweak engine is double a clock rate of the encryption interface.

In Example 16, the processor of Examples 11-15 where the encryption interface can emulate the system agent interfacing with the memory controller by structuring the encrypted request to be a same structure as messages sent directly from the system agent to the memory controller.

In Example 17, the processor of Examples 11-16 where the encryption interface can further: a) receive an encrypted response from the memory controller; b) decrypt the encrypted response to obtain a decrypted response; and c) communicate the decrypted response to the memory controller.

In Example 18, the processor of Examples 11-17 where the hardware functional block can be at least one of processor core, a graphics core, a cache agent, a system agent, or a memory agent.

Various embodiments may have different combinations of the structural features described above. For instance, all optional features of the processors and methods described above may also be implemented with respect to a system described herein and specifics in the examples may be used anywhere in one or more embodiments.

In Example 19, a method including: 1) receiving, at an encryption interface, an encrypted response from a memory controller; 2) decrypting, by the encryption interface, the encrypted response to obtain a decrypted response, where the encryption interface emulates the memory controller interfacing with a system agent; and 3) sending, from the encryption interface, the decrypted response to the system agent, where the system agent communicates the decrypted response to an application.

In Example 20, the method of Example 19 further including: a) storing, at a ciphertext buffer, the encrypted response while the encryption interface computes a tweak for an encrypted request, wherein the ciphertext buffer stores a plurality of encrypted responses; and b) selecting, by the encryption interface, an encrypted response from the plurality of encrypted responses to decrypt.

In Example 21, the method of Examples 19-20 further includes decrypting the encrypted response using a decryption engine to obtain the decrypted response, wherein the decryption engine uses an advanced encryption standard (AES) xor-encrypt-xor (XEX) encryption mode with tweak and ciphertext stealing (XTS) encryption standard to decrypt the encrypted response.

In Example 22, the method of Examples 19-21 further includes bypassing the ciphertext buffer to send the encrypted response directly to the decryption engine when the ciphertext buffer is empty.

In Example 23, the method of Examples 19-22 further includes selecting a response link to send the decrypted response to the system agent while the encrypted response is decrypted.

Various embodiments may have different combinations of the structural features described above. For instance, all optional features of the processors and methods described above may also be implemented with respect to a system described herein and specifics in the examples may be used anywhere in one or more embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to secure memory repartitioning in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
a system agent to communicate a plaintext request with a hardware functional block;
a tweak buffer to store a tweak until the plaintext request is received at an encryption interface, wherein the tweak is a unique address indicating a location of data for the plaintext request in a main memory;
the encryption interface coupled between an upstream component and a downstream component the encryption interface being transparent to at least one of the upstream component or the downstream component, wherein the encryption interface is to:
receive the plaintext request from the upstream component;
encrypt the plaintext request to obtain an encrypted request, wherein the encryption interface is to emulate the upstream component interfacing with the component by structuring the encrypted request to be a same structure as messages sent directly from the upstream component to the downstream component; and
communicate the encrypted request to downstream component; and
the downstream component to communicate the encrypted request to the main memory of a computing device.

2. The processor of claim 1, wherein the encryption interface and the upstream component are integrated into a system on a chip (SoC).

3. The processor of claim 1, wherein the encryption interface to encrypt the plaintext request using an advanced encryption standard (AES) xor-encrypt-xor (XEX) encryption mode with tweak and ciphertext stealing (XTS) encryption.

4. The processor of claim 3, wherein the encryption interface to use the AES XTS encryption to generate the tweak, wherein the tweak is a unique address indicating a location of data for the plaintext request in the main memory.

5. The processor of claim 1, wherein the encryption interface is further to:
receive a plurality of request messages at the encryption interface;
buffer the plurality of request messages at a request buffer of the encryption interface; and
select the request message from the plurality of request messages at the request buffer to communicate to the downstream component.

6. The processor of claim 5, wherein the encryption interface is further to bypass the request buffer to send the request message directly to the downstream component when the request buffer is empty.

7. The processor of claim 1, wherein the plaintext request is a first request to read data from the main memory or a second request to write data to the main memory.

8. The processor of claim 1, wherein the hardware functional block is at least one of a processor core, a graphics core, a cache agent, a second upstream component, or a memory agent.

9. A method comprising:
receiving, at an encryption interface, an encrypted response from a downstream component;
decrypting, by the encryption interface, the encrypted response to obtain a decrypted response, wherein the encryption interface emulates the downstream component interfacing with a upstream component by structuring the encrypted request to be a same structure as messages sent directly from the upstream component to the downstream component; and
sending, from the encryption interface, the decrypted response to the upstream component wherein the system agent upstream component communicates the decrypted response to an application.

10. The method of claim 9, further comprising:
storing, at a ciphertext buffer, the encrypted response while the encryption interface computes a tweak for an encrypted request, wherein the ciphertext buffer stores a plurality of encrypted responses; and
selecting, by the encryption interface, the encrypted response from the plurality of encrypted responses to decrypt.

11. The method of claim 10, further comprising decrypting the encrypted response using a decryption engine to obtain the decrypted response, wherein the decryption engine uses an advanced encryption standard (AES) xor-encrypt-xor (XEX) encryption mode with tweak and ciphertext stealing (XTS) encryption standard to decrypt the encrypted response.

12. The method of claim 11, further comprising bypassing the ciphertext buffer to send the encrypted response directly to the decryption engine when the ciphertext buffer is empty.

13. The method of claim 9, further comprising selecting a response link to send the decrypted response to the upstream component while the encrypted response is decrypted.

14. The processor of claim 1, wherein the upstream component is the system agent is and the downstream component is a memory controller.

15. The method of claim 9, wherein the upstream component is a system agent is and the downstream component is a memory controller.

* * * * *